United States Patent Office 3,168,564
Patented Feb. 2, 1965

3,168,564
AMINOSPIRO[3.3]HEPTANE DERIVATIVES
Leslie G. Humber, Montreal, Quebec, Canada, assignor to American Home Products Corporation, New York, N.Y., a corporation of Delaware
No Drawing. Filed Mar. 12, 1963, Ser. No. 264,722
3 Claims. (Cl. 260—570.5)

This invention relates to novel chemical compounds, certain new derivatives at spiro[3.3]heptane and to the process utilized in their preparation. More particularly my invention relates to aralkylaminoalkyl and substituted aralkylaminoalkyl derivatives of spiro[3.3]heptane, which new chemical compounds possess valuable pharmacological properties.

The new chemical compounds, in base form, may be generically represented by the Formula I

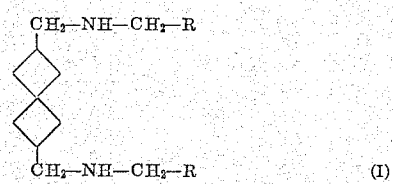

wherein R represents aryl or substituted aryl.

The novel chemical compounds possessing interesting biological activities, in base form, are thus 2,5-bis(aralkyl or substituted aralkylaminomethyl)-spiro[3.3]heptanes. These compounds, being basic in nature, form tertiary acid addition salts. Such acid addition salts with pharmacologically acceptable acids are biologically equivalent to the free bases, and constitute a preferred form for the administration of the compounds of my invention.

The new chemical compounds forming the subject of this invention are useful as agents for lowering cholesterol levels in the blood. For example, Compound I, wherein R is orthochlorophenyl, will lower the cholesterol blood level in the intact rat by up to 45% when administered orally at a dose of 75 micromoles per kilogram of body weight.

My preferred procedure for preparing the new chemical compounds may be described as follows:

Spiro[3.3]heptane-2,5-dicarbonylchloride, a compound previously described by Backer and Schurnik, Rec. Trav. Chim., 50, 921 (1931), is reacted with aqueous concentrated ammonia, preferably at low temperature. The resulting diamide, spiro[3.3]heptane-2,5-dicarboxamide, is reduced, preferably with lithium aluminum hydride in refluxing tetrahydrofuran, to 2,5-bisaminomethyl-spiro-[3.3]heptane. The bisaminomethyl derivative of spiro-[3.3]heptane is caused to react with a suitable benzaldehyde or substituted benzaldehyde and removing two molecules of water from the reaction mixture. The resulting benzylidine, or substituted benzylidine, derivative (a Schiff base) may then be reduced to the corresponding secondary amino derivative by treatment with a reducing agent, such as, for example, by treatment with sodium borohydride; hydrogen and platinum oxide; or lithium aluminum hydride.

The free base is then recovered, preferably by evaporation off of the solvent. The resultant product may then be converted to a suitable acid addition salt by conventional means, as by treatment with a pharmacologically acceptable acid. For example, the hydrochloride salts may be readily obtained by treatment of the base with hydrogen chloride in ether solution.

This process may be indicated schematically as follows:

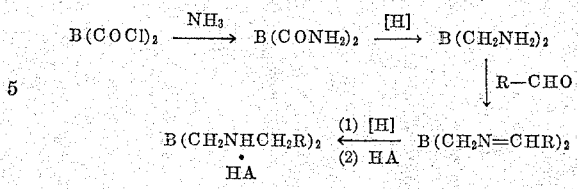

in which B represents the divalent spiro[3.3]heptyl group, with the two substituents attached in the 2,5-positions; R represents phenyl or substituted phenyl; and HA represents a pharmacologically acceptable acid.

The following examples illustrate my invention further.

EXAMPLE 1

Spiro[3.3]heptane-2,5-dicarboxamide

Spiro[3.3]heptane-2,5-dicarbonylchloride (6.0 gm.) was added slowly to aqueous conc. ammonium hydroxide (60 ml.) at 10–15° C. The mixture was stirred for 3 hours at room temperature. The resulting compound, spiro[3.3]heptane-2,5-dicarboxamide, was filtered off, washed with water and dried. It had a melting point of 252–259° C. In the infra-red spectrum it had bands at 3410 cm.$^{-1}$, 3220 cm.$^{-1}$ and 1650 cm.$^{-1}$.

EXAMPLE 2

2,5-bis(aminomethyl)-spiro[3.3]heptane

The spiroheptanediamine, of Example 1, was added to lithium aluminum hydride (1.99 gm.) in tetrahydrofuran solution. The mixture was refluxed for 24 hours, cooled and the excess lithium aluminum hydride destroyed with water. The precipitated salts were removed by filtration and the filtrate evaporated to yield 2,5-bis(aminomethyl)-spiro[3.3]heptane as an oil. A dihydrochloride salt was prepared and crystallized from a methanol-isopropanol mixture. It had a melting point in excess of 310° C.

Analysis confirmed the empirical formula $C_9H_{20}N_2Cl_2$.

EXAMPLE 3

2,5-bis(o-chlorobenzylaminomethyl)-spiro[3,3]heptane

The bisaminomethylspiroheptane described in Example 2 was condensed with two equivalents of o-chlorobenzaldehyde to yield the corresponding Schiff base. It was reduced directly in methanol solution with sodium borohydride (1.0 gm.), to yield 2,5-bis(o-chlorobenzylaminomethyl)-spiro[3.3]heptane; λ max. 265 mμ ε=461).

A dihydrochloride salt was prepared by treatment of the base with hydrogen chloride in ether solution. It crystallized from a methanol-ether mixture and had a melting point of 224–230° C.

Analysis confirmed the empirical formula $C_{23}H_{30}N_2Cl_4$ for the dihydrochloride salt.

I claim:

1. A compound selected from the group which consists of 2,5-bis(o-chlorobenzylaminomethyl)-spiro[3.3]heptane and its dihydrochloride salt.
2. 2,5-bis(o-chlorobenzylaminomethyl)-spiro[3.3]heptane.
3. The dihydrochloride salt of 2,5-bis(o-chlorobenzylaminomethyl)-spiro[3.3]heptane.

References Cited in the file of this patent

UNITED STATES PATENTS 2,797,242    Edgerton et al. _____ June 25, 1957

OTHER REFERENCES

Rice et al.: "Journ. Orgn. Chem.," vol. 26, pp. 54–58 (1961).